Jan. 31, 1928.
H. A. BARUTIO
GASKET
Filed Sept. 19, 1925
1,657,877
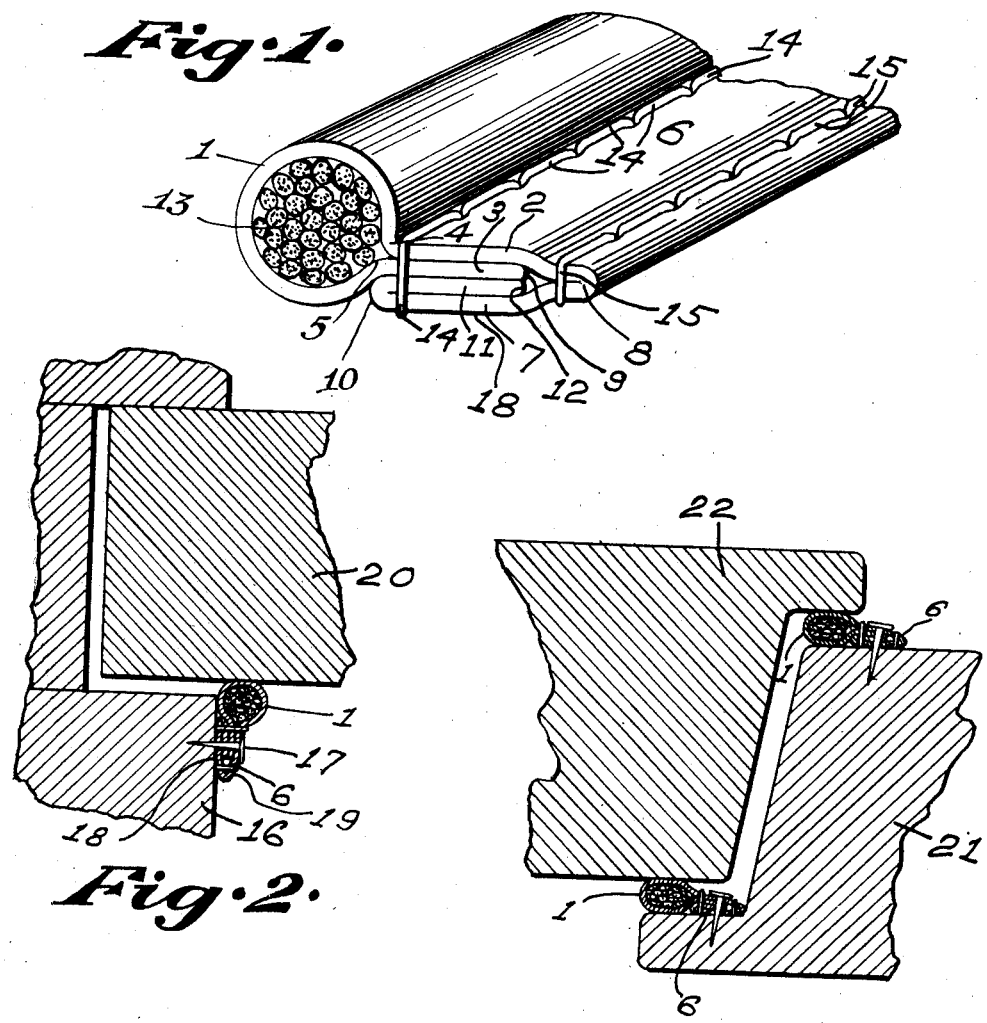
Inventor:
Helen Anna Barutio
By Hugh K. Wagner
Attorney.

Patented Jan. 31, 1928.

1,657,877

UNITED STATES PATENT OFFICE.

HELEN ANNA BARUTIO, OF ST. LOUIS, MISSOURI.

GASKET.

Application filed September 19, 1925. Serial No. 57,329.

This invention relates to gaskets, and has more particular reference to improvements in packing strips of the type comprising an elongated body of yielding packing and a strip of flexible material having a substantially tubular inclosing portion surrounding said packing and an attaching flange extending from one side of the packing. Such a packing strip may be used to form a seal between various objects, but it is especially adapted for use as a weather strip on doors and windows and around refrigerator doors and, also, for vibratory absorption purposes.

As manufactured, the attaching flange of the gasket strips hitherto used is approximately radial to the tubular portion, but when the flange is attached to a flat surface, it is forced to lie tangential to the tubular portion, so that the flexible covering material in this abnormal position is under stress at the juncture of the flange and the tubular portion. Furthermore, the stress tending to restore the flange to its normal radial position tends to raise the flange from the flat surface to which it is attached, thus placing additional strain on the tacks or other fastening means which secures the flange to the surface.

Accordingly, an object of the present invention is to provide a strip having a flange so formed that it may be readily accommodated to a flat attaching surface with a minimum of strain on the flexible covering of the strip and the means which secures the flange to the surface.

Furthermore, when the old form of strip is used in places where the pressure is exerted against the tubular portion on the side opposite the flange and parallel to the attaching surface, as is the case when weatherstripping windows, the tubular portion bends about its junction with the flange, instead of compressing under the pressure exerted thereagainst, as will be explained more fully hereinafter.

Accordingly, another object of the present invention is to provide a strip which may be so attached to a window frame that the juncture of the tubular portion and the flange is more nearly in the line of the compressing force, so as to react more nearly squarely against the same, instead of forming a turning couple therewith as in strips of the prior art.

Another object is to provide a gasket in which all the seams are concealed when the gasket is secured in place, so that a neat and smooth continuous surface and edge is presented exteriorly.

Other objects and advantages will appear in the course of the following description of preferred embodiments of the invention.

In the accompanying drawings forming part of this specification, in which like numbers of reference denotes like parts wherever they occur, Figure 1 is an enlarged perspective view of an end fragment of one form of an elongated gasket embodying the features of this invention;

Figure 2 is a fragmentary transverse sectional view of a window frame, showing the gasket attached thereto;

Figure 3 is an end view of a modified form of the invention; and

Figure 4 is a fragmentary transverse sectional view of a wall and door of a refrigerator showing two of the gaskets interposed therebetween.

The form of the invention illustrated in Figures 1, 2, and 4 comprises a strip of flexible, pliable material, preferably waterproof fabric or fabric coated with rubber on its outer side, having an intermediate tubular portion 1 and attaching portions 2 and 3 extending as continuations from the respective meeting edges 4 and 5 of the tubular portion 1 to form superposed layers of an attaching flange 6. The portion 2 has a marginal extension 7 folded backwardly on a line 8 disposed farther out than the outer longitudinal edge 9 of the other attaching portion 3 so that the portion 3 is inclosed or covered thereby, the said portion 7 being bent inwardly and forwardly at the inner longitudinal edge 10 of said flange 6 to form a portion 11 intermediary of the portions 3 and 7. The terminating longitudinal edge 12 of the portion 11 in this form of the invention coincides with the edge 9 of the portion 3.

The tubular portion 1 incloses a filling 13 of packing material, preferably an elongated body of yielding packing which may be built up of soft fibrous cord into a circular cross-section. This packing will freely yield to form an effective seal, and when the pressure is relieved will resume its normal circular shape.

The layers 2, 3, 7, and 11 may be secured together in any suitable manner, as by cementing or sewing, to form the compact reinforced flange 6 and to confine the packing 13 within the tubular portion 1. It is preferable, however, to pass stitches 14 through and unite the portions 2, 3, 7, and 11 at the junction of the portions 2 and 3 with the tubular portion 1, so as to closely confine the packing 13 in the tubular portion 1. Stitches 15 may also pass through and unite the layers 2 and 7 at their juncture or bend 8.

When the form of Figure 1 is secured to the side of a window frame 16 as in Figure 2, by means of tacks 17, the flange portion 6 is shifted transversely only slightly from its normal position with relation to the tubular portion 1 in order to bring its seating face 18 into a position tangential with the tubular portion 1. This relieves the tacks of the undue strain required in prior gaskets to force the flange from its normal radial position to one tangential with the tubular portion when secured to a flat surface. The strain may be removed entirely by increasing the thickness of the flange 6 towards its seating side 18 until the said side is normally tangential to the tubular portion, but with the thickness of flange toward the side 18 indicated in Figure 1 the strain is practically negligible.

It will be observed, also, that, when the gasket is applied as in Figure 2, the exposed side 19 of the flange is substantially radial, notwithstanding that its seating side 18 is substantially tangential. When, therefore, the sash 20 exerts pressure against the tubular portion 1, this pressure is squarely opposed by the reaction of that portion of the flange substantially radial to the tubular portion, so that the tendency to shift the tubular portion about its junction with the flange portions away from the side of the window frame 16 is practically negligible. In prior gaskets of this type the thin tangential flanges of the attached gasket could oppose no radial reaction to the pressure of the sash, so that the tubular portion was shifted instead of being compressed to make a tight joint.

In the form shown in Figure 3, the layer 3 does not extend as far out as the layer 2, and the layer 11 has its outer longitudinal edge 12 still further retracted than the edge 9. This construction produces, with a minimum of material, a wedge-shaped flange whose seating side 18 is normally tangential to the tubular portion 1.

Figure 4 illustrates the manner of attaching the gaskets to a refrigerator wall 21, so that when the door 22 is closed the tubular portion 1 of the gaskets is compressed.

It will be observed that, when the gaskets are secured in position, no unsightly seams or joints are visible and a neat smooth exterior is presented.

Having thus fully described this invention, I hereby reserve the benefit of all changes in form, arrangement, order, or use of parts, as it is evident that many minor changes may be made therein without departing from the spirit of this invention or the scope of the following claims.

I claim:

1. As an article of manufacture, a gasket comprising a strip of flexible material having a tubular portion and an attaching flange extending from one side of said tubular portion, the said flange being formed in superposed layers of different respective widths so that their outer edges are at different distances from the tubular portion, whereby the thickness of the flange decreases progressively from its inner margin to its outer edge, so that the flange presents one side substantially radial and another substantially tangential to the tubular portion, and a filling of packing material in the tubular portion.

2. As an article of manufacture, a gasket comprising a strip of flexible material having a tubular portion and attaching portions extending from one side of the tubular portion to form a pair of layers of an attaching flange, one of the said attaching portions having a marginal extension folded backwardly to inclose the other of said attaching portions and then folded forwardly to form an enclosed flap intermediary of itself and the enclosed attaching portion, one of the said inclosed elements being narrower than the other and both being narrower than the flange, whereby a flange of progressively increasing thickness is formed; and a filling of packing material in the tubular portion.

3. As an article of manufacture, a gasket comprising a strip of flexible material having a tubular portion and attaching portions extending from one side of said tubular portion to form an attaching flange, one of said attaching portions extending beyond the other and being bent backwardly to inclose the same, a filling of packing material in the tubular portion, stitches passing through and uniting said attaching portions and said inclosing backwardly bent portion at the junction of said tubular inclosing portion and the attaching portions so as to close said tubular portion and confine the packing therein, and stitches passing through and uniting the extended attaching portion and its backwardly bent portion at the outer edge of said attaching flange.

4. As an article of manufacture, a gasket comprising a strip of flexible material having a tubular portion and attaching portions extending from one side of said tubular portion to form an attaching flange, one of said attaching portions having a marginal extension folded backwardly on a line farther out than the outer longitudinal edge of the other attaching portion so that the said other attaching portion is inclosed thereby, the said backwardly folded extension being bent inwardly and forwardly at the inner longitudinal edge of said flange, a filling of packing material in the tubular portion, stitches passing through and uniting said attaching portions and the backwardly and forwardly folded layers of the said attaching portion extension at the junction of said tubular inclosing portion and the attaching portions so as to close said tubular portion and confine the packing therein, and stitches passing through and uniting the extended attaching portion and its extension at the outer edge of said attaching flange.

5. As an article of manufacture, a gasket comprising a strip of flexible material having a tubular portion and attaching portions extending from one side of said tubular portion to form an attaching flange, one of said attaching portions having a marginal extension folded backwardly on a line farther out than the outer longitudinal edge of the other attaching portion so that the said other attaching portion is inclosed thereby, the said backwardly folded extension being bent inwardly and forwardly at the inner longitudinal edge of said flange to a terminating edge disposed in retracted relation to the outer longitudinal edge of the said other attaching portion, a filling of packing material in the tubular portion, stitches passing through and uniting said attaching portions and the backwardly and forwardly folded layers of the said attaching portion extension at the junction of said tubular inclosing portion and the attaching portions so as to close said tubular portion and confine the packing therein, and stitches passing through and uniting the extended attaching portion and its extension at the outer edge of said attaching flange.

6. As an article of manufacture, a gasket comprising a tubular portion and a flange portion, said flange portion having such thickness relatively to the tubular portion that one side of said flange portion will lie substantially in radial relation to said tubular portion and that the other side of said flange will lie tangentially with relation to said tubular portion.

In testimony whereof I hereunto affix my signature.

HELEN ANNA BARUTIO.